United States Patent [19]

Wang

[11] Patent Number: 4,967,180

[45] Date of Patent: Oct. 30, 1990

[54] PRE-IMPACT ALARM APPARATUS

[76] Inventor: Hsug-Fang Wang, 129 Tuan-Chu Lane, Tuan-Cbu Li, Chiayi City, Taiwan

[21] Appl. No.: 351,475

[22] Filed: May 15, 1989

[51] Int. Cl.⁵ .............................................. B60Q 5/00
[52] U.S. Cl. .................................... 340/436; 340/437; 340/932.2; 200/61.44; 116/28 A
[58] Field of Search ................ 340/437, 436, 932.2, 340/435; 116/28 A; 200/61.44, DIG. 10

[56] References Cited

U.S. PATENT DOCUMENTS

| | | | |
|---|---|---|---|
| 2,144,286 | 1/1939 | Dawson | 340/437 |
| 2,208,697 | 7/1940 | Kernodle et al. | 200/61.44 |
| 2,786,910 | 3/1957 | Tyska | 340/437 X |
| 3,012,535 | 12/1961 | Schwartz et al. | 116/28 A |
| 3,018,344 | 1/1962 | Vinci | 340/437 X |
| 3,089,455 | 5/1963 | Aves | 340/437 X |

Primary Examiner—Joseph A. Orsino
Assistant Examiner—Brian R. Tumm

[57] ABSTRACT

A pre-impact alarm apparatus which is adapted to signal the driver of a motor vehicle that obstacles exist in the path of the car while said car is backing up. The pre-impact alarm apparatus has a flexible sensing bar to be installed at a rear cover of a car which generates a signal that activates a buzzer to warn the driver when making contact with an obstacle, therefore improving upon the infrared alarm apparatus which can not warn the driver when the car is approaching an obstacle at an angle.

3 Claims, 4 Drawing Sheets

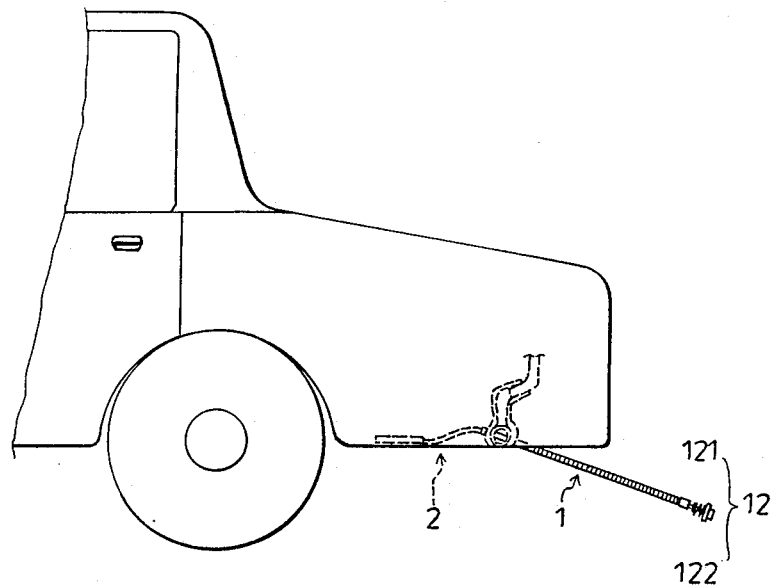
F I G. 4A
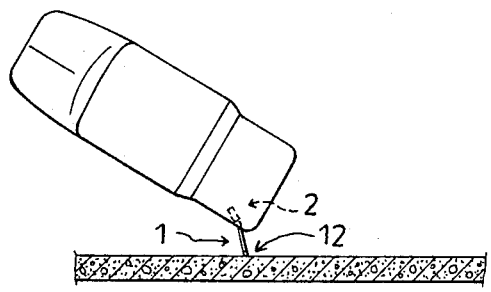
F I G. 4B

PRE-IMPACT ALARM APPARATUS

BACKGROUND OF THE INVENTION

The present invention relates to a pre-impact alarm apparatus, more particularly to an alarm apparatus which can sense when a car in the process of backing up is about to impact with an obstacle, and can generate an audio-alarm to warn the driver that such a situation exists.

Pre-impact alarm apparatuses are widely used for sensing whether or not a car in the process of backing up is about to impact with an obstacle. FIGS. 1A and 1B show a car provided with a conventional infrared alarm apparatus B installed on its rear side. As shown in FIG. 1A, while the car is in reverse, the conventional infrared alarm apparatus can generate an infrared signal to sense an obstacle A within a certain distance and simultaneously generate an audio-alarm to warn the driver that such an obstacle exists. However, as shown in FIG. 1B, when the car wishes to parallel park on the roadside, especially in a space between two rather closely parked cars, a conventional infrared alarm apparatus B can not give an appropriate warning to the driver of an obstacle A due to the angle of approach of the car.

SUMMARY OF THE INVENTION

The object of the present invention is therefore to provide a pre-impact alarm apparatus which is adapted to generate an appropriate warning to signal the driver of the fact that obstacles exist to the side of the car, while said driver is backing up said car.

The present invention accordingly provides a preimpact alarm apparatus comprising: a flexible sensing bar having a first end and a second end, said first end having a positioner affixed thereon which is adapted to affix said sensing bar at a rear portion of a car, said second end having a sensing head adapted to impact with an obstacle and generate a signal; and an audio-apparatus electrically connected with said sensing head of said sensing bar, said audio-apparatus being adapted to receive the signal generated by said sensing head and generate an audio-alarm.

The sensing bar which comprises the above-mentioned structure is preferably installed on a rear corner of a car at an angle of preferably 45 degrees. In an ideal situation, both rear corners of a car would be installed with such a sensing bar.

BRIEF DESCRIPTION OF THE DRAWINGS

The present invention is illustrated by way of the accompanying drawings, in which:

FIG. 4A is an exemplary view showing a car installed with the embodiment illustrated in FIGS. 1 and 2; and FIG. 4B is an exemplary view of the car illustrated in FIG. 4A in the process of backing up in order to park at the roadside.

DETAILED DESCRIPTION OF THE INVENTION

Figure 1A:
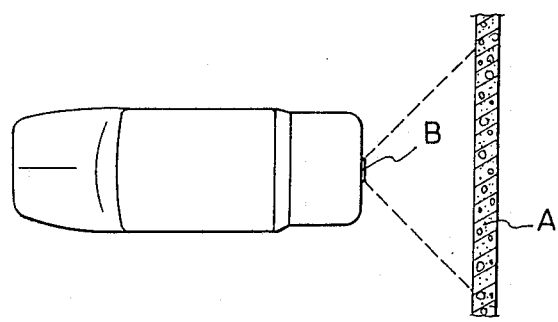
FIG. 1A is an exemplary view of a reversing car installed with an infrared alarm apparatus on its rear side.
Figure 1B:
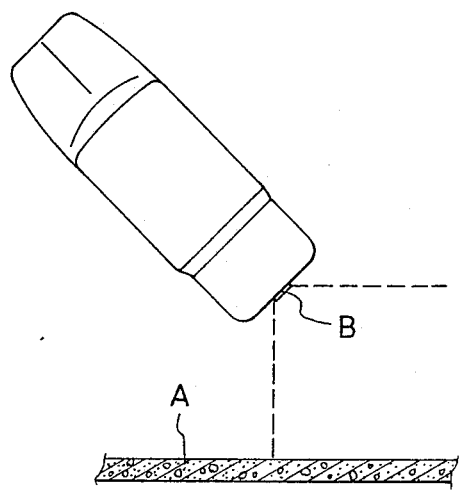
FIG. 1B is an exemplary view of a car which is in the process of backing up to park on the roadside.
Figure 2:
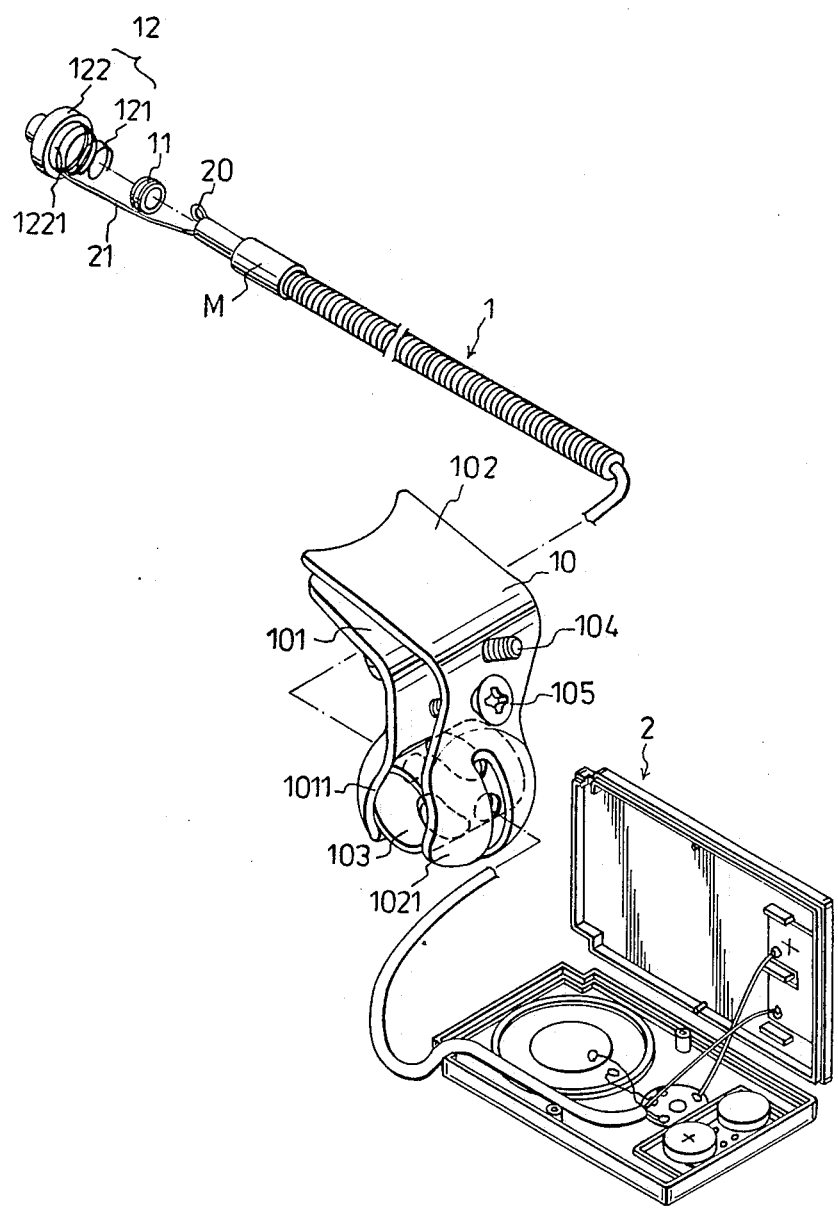
FIG. 2 is an exploded view of an embodiment according to the present invention.
Figure 3:
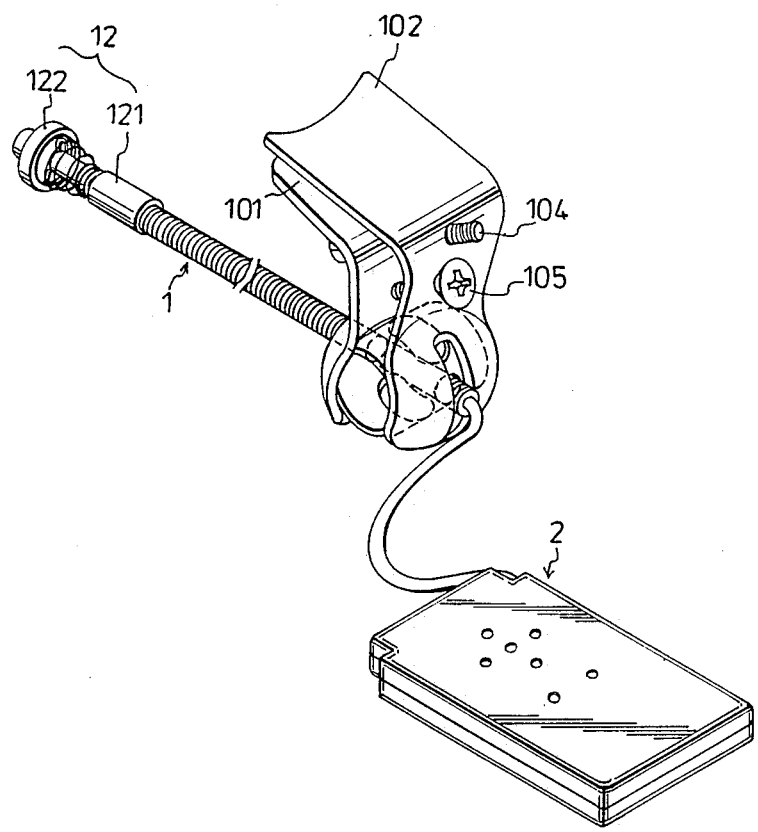
FIG. 3 is an assembled view of the embodiment illustrated in FIG. 2.

Referring to FIGS. 2 and 3, the present invention generally comprises a flexible sensing bar 1 and an audio-apparatus 2, such as a buzzer. Said flexible sensing bar 1 is made of a steel bellows, substantially having a first end and a second end. There is a positioner 10 affixed to said first end, said positioner 10 being adapted to affix said sensing bar at a rear portion of a car. There is also a sensing head 12 installed at the second end, said sensing head 12 being adapted to impact with an obstacle, thereby generating a signal. Said audio-apparatus 2 is electrically connected with said sensing head 12 by means of electric wires 20,21 passed through said sensing bar 1. Said audio-apparatus 2 is adapted to receive the signal generated by said sensing head 12 and therefrom generate an audio-alarm.

Specifically, said sensing head 12 comprises a conductive copper bushing M, an insulating bushing 11, a spiral coil spring 121 and a conductive head 122. More specifically, said copper bushing M is sleeved on a position of said sensing bar 1 near said second end installed with said sensing head 12. Said insulating bushing 11 is sleeved on a position of said sensing bar 1 which is nearer said second end than said copper bushing M. Said spiral coil spring 121 having a large coil end and a small coil end is disposed around said sensing bar 1, with said small coil end fastened on said insulating bushing 11 and said large coil end extended beyond said second end. Said conductive head 122 is a circular disc with a lobe protruded on the surface of one side thereof and a concave portion 1221 formed on the surface of the other side thereof, said concave portion 1221 being fastened with said large coil end of said spiral coil spring 121.

Said positioner 10 is constructed as a clip comprising a first plate 101, a second plate 102 paralleled with said first plate 101, a spool 103 with a pair of corresponding holes formed therethrough and two bolts 104, 105 for joining said first and second plates 101, 102. Said first and second plates 101, 102 are both bent to form L-shaped plates, each L-shaped plate having a corresponding arcuate end 1011 which defines a circular channel with the other corresponding arcuate end 1021 so as to rotatably support said spool 103 therein. A pair of long slots are respectively and correspondingly formed in said arcuate ends, said slots being aligned with said holes correspondingly formed in said spool to constitute a channel for supporting said sensing bar 1 therethrough.

Said copper bushing M and said conductive head 122 are respectively and electrically connected with said audio-apparatus 2 by means of said electric wires 20,21, constituting a normally open circuit with a normally open contact formed between said copper bushing M and said conductive head 122.

FIG. 4A shows how a sensing bar 1 constructed according to the abovementioned process can be installed at the rear corners of a car. This is done by regulating the space between said first and second plates 101, 102 by means of said bolts 104, 105 while simultaneously adjusting the second end of said sensing bar 1 upward or downward to the appropriate position by of rotating said spool 103 rotating said spool 103 moves said first end of said sensing bar 1 along said long slots respectively formed in said corresponding arc portions of said first and second plates 101, 102. The positioner 10 is attached at an appropriate position of said car by means of said first and second plates 101, 102 and said bolts 104, 105. Said sensing head 12 is then extended so that it is tilted at a certain angle in relation to the body of said car. An audio-apparatus 2, constructed as described above, can be placed anywhere inside or outside said car.

FIG. 4B shows a car with a pre-impact alarm apparatus constructed according to this invention installed in one corner thereof, with said sensing head 12 of said sensing bar 1 extended out at an angle to a position from the left side body of said car. When said sensing head 12 impacts with an obstacle while the driver is reversing the car at an angle, in relation to the roadside, said conductive head 122 will be pressed and said spiral coil spring 121 will be bent, closing said normally open contact formed between said conductive head 122 and said copper bushing M and activating said audio apparatus to generate an audio alarm to warn the driver.

While the invention has been described in connection with what is presently considered to be the most practical and preferred embodiment, it is to be understood that the invention is not to be limited to the disclosed embodiment, but on the contrary, is intended to cover all the various modifications and equivalent arrangements included within the spirit and scope of the broadest interpretation.

I claim:

1. A pre-impact alarm apparatus comprising:

a flexible sensing bar having a first end and a second end, said first end having a positioner affixed thereon which is adapted to affix said sensing bar at a position of a car, said second end having a sensing head adapted to impact with an obstacle and generate a signal; and an audio-apparatus electrically connected with said sensing head of said sensing bar, said audio-apparatus being adapted to receive the signal generated by said sensing head and generate an audio-alarm;

said sensing head further comprising:

a conductive bushing sleeved on said sensing bar, at a position near said second end;

an insulating bushing sleeved on a position of said sensing bar, which is nearer said second end than said conductive bushing;

a spiral coil spring having a large coil end and a small coil end, said spiral coil spring being disposed around said sensing bar, fastening said small coil end on said insulating bushing and extending said large coil end beyond said second end; and a conductive head affixed with said large coil end of said spiral coil spring, so that when said conductive head impacts with an obstacle, said spiral coil spring is bent to make said conductive head contact with said conductive bushing.

2. A pre-impact alarm apparatus as claimed in claim 1, wherein said positioner is a clip comprising:

a first plate with an arcuate end having a long slot opened therethrough;

a second plate with a corresponding arcuate end having a long slot opened therethrough, corresponding to said long slot of said first plate, said second plate being placed parallel with said first plate, defining a space therebetween and a substantially circular channel between their arcuate ends;

at least one screw bolt passed through said first and second plates for regulating the width of said space defined therebetween so as to clip said positioner at a certain position of a car; and a spool with a pair of corresponding holes formed therethrough, said spool being supported within said circular channel, aligning said holes with said slots respectively opened in said arcuate ends of said first and second plates;

whereby said first end of said sensing bar can be supported within a channel constituted by said corresponding holes formed in said spool and said slots formed in said plates, and the position of said second end of the same can be regulated by rotating said spool within the limits of said slots.

3. A pre-impact alarm apparatus as claimed in claim 1, wherein said conductive bushing and said conductive head are respectively and electrically connected with said audio-apparatus, constituting a normally open circuit with a normally open contact formed between said conductive bushing and said conductive head.

* * * * *